United States Patent [19]

Gordon

[11] 4,170,198
[45] Oct. 9, 1979

[54] SEMI-AUTOMATIC MILK FLOW SENSOR

[76] Inventor: Philip D. Gordon, 4690 Willow Rd., Saline, Mich. 48176

[21] Appl. No.: 835,348

[22] Filed: Sep. 21, 1977

[51] Int. Cl.² .............................................. A01J 5/04
[52] U.S. Cl. .............................. 119/14.08; 119/14.46
[58] Field of Search ............... 119/14.08, 14.05, 14.43, 119/14.46; 137/192, 390

[56] References Cited

U.S. PATENT DOCUMENTS

| | | | |
|---|---|---|---|
| 998,856 | 7/1911 | Mitchell | 119/14.08 |
| 2,685,862 | 8/1954 | Hill et al. | 119/14.08 |
| 3,185,132 | 5/1965 | Allard | 119/14.08 |
| 3,786,782 | 1/1974 | Abrahamson et al. | 119/14.08 |

*Primary Examiner*—Hugh R. Chamblee
*Attorney, Agent, or Firm*—Olsen and Stephenson

[57] ABSTRACT

Apparatus is disclosed providing for the semi-automatic operation of a milk flow sensor having a chamber in which a valve supported by a float is disposed for controlling the flow of milk through the sensor. An externally actuated arm member serves to elevate the float and valve to enable the initial flow of milk through the sensor. Means is provided for the automatic return of the arm member to its original position in which it does not affect the movement of the float and valve after a sufficient amount of milk has been supplied to the chamber to support the float and valve in their elevated positions.

8 Claims, 7 Drawing Figures

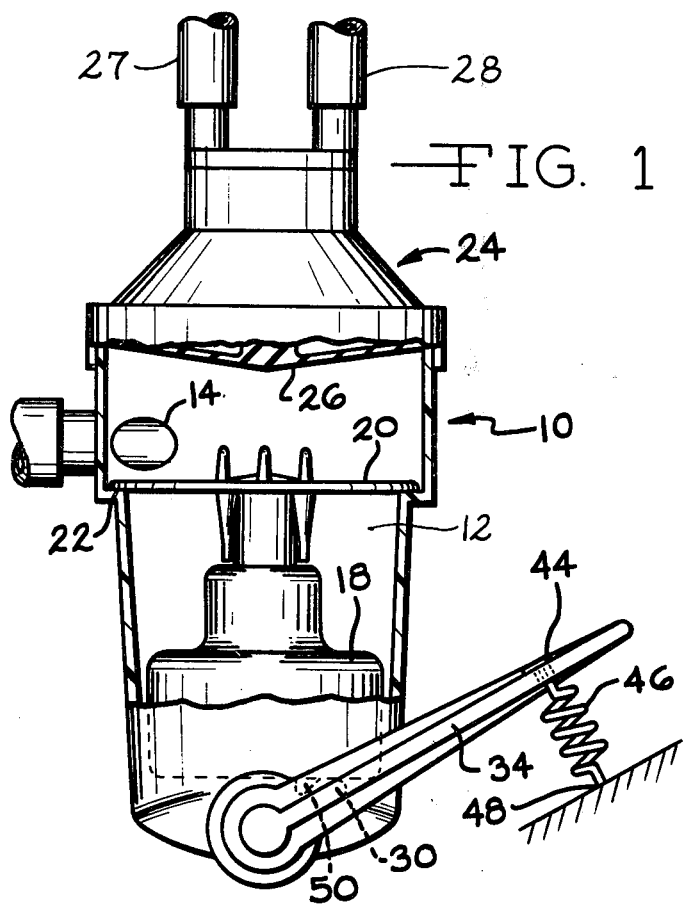
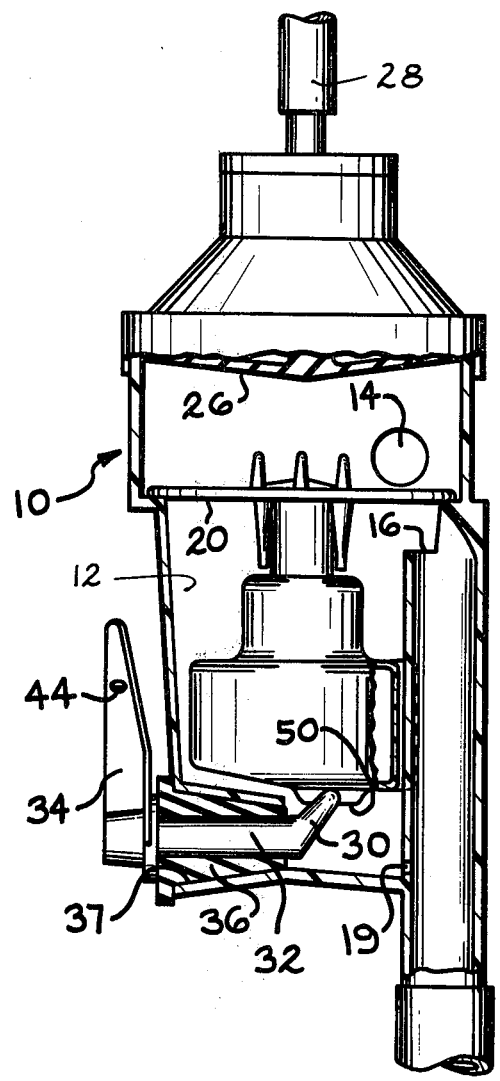
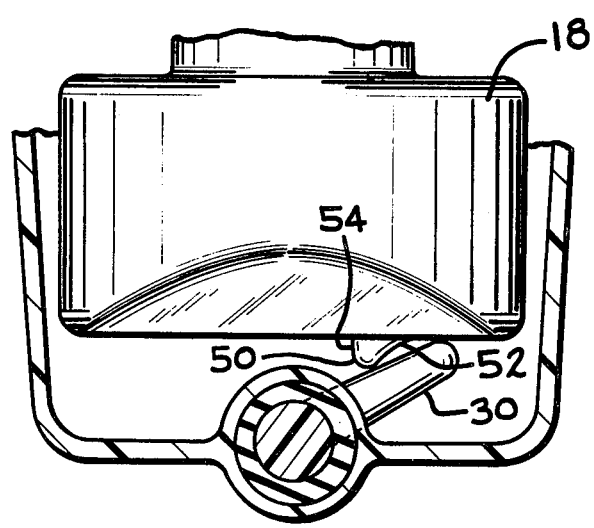
FIG. 1
FIG. 2
FIG. 3

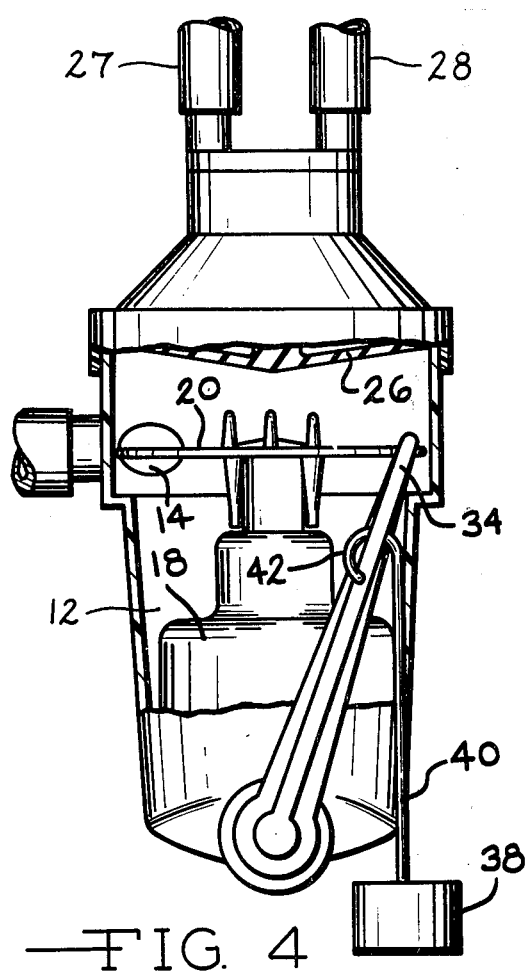
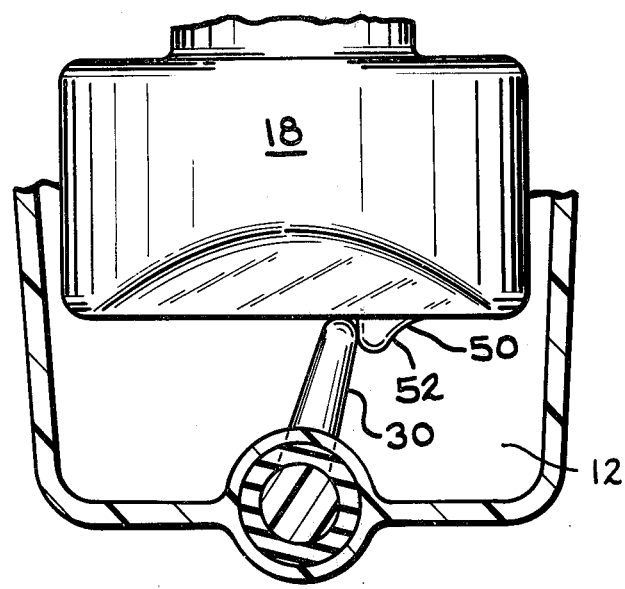
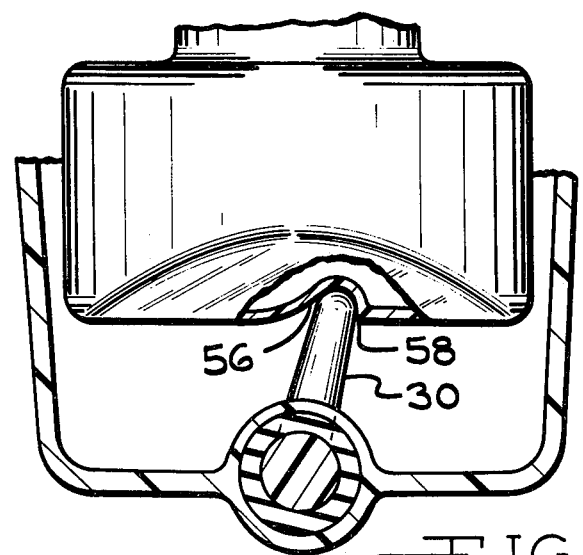
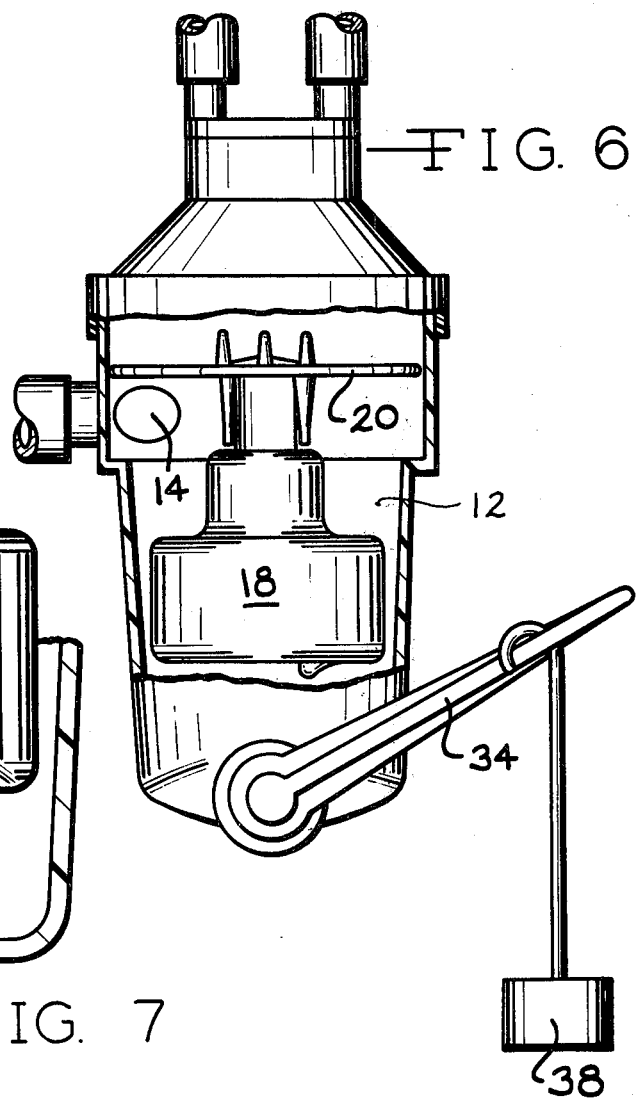

SEMI-AUTOMATIC MILK FLOW SENSOR

BACKGROUND OF THE INVENTION

The present invention is an improvement on milk flow sensors used in milking systems, particularly of the type marketed by Dairy Equipment Company under the trademark BOU-MATIC Milking Systems.

Milk flow sensors of this type are used to control automatic milking equipment for milking cows by detecting when the cow has finished milking and then providing a signal that controls the equipment to remove the teat cups from the cow's udder. The milk flow sensor consists of a chamber having an inlet and an outlet located below the inlet. A float having a disk valve mounted thereon is disposed in the chamber for substantially vertical movement in the chamber to open and close communication between the inlet and the outlet. A diaphragm and a diaphragm valve are mounted on the sensor to cover the chamber and serve to control air lines which regulate the teat releasing mechanisms.

The float and disk valve are initially elevated by a manually actuated arm member to establish communication between the inlet and outlet of the chamber which allows for the flow of milk into the chamber. The arm member is connected to an externally located lever which operates to move the arm member in the chamber. After a sufficient amount of milk is contained in the chamber to support the float and the disk valve so as to maintain open communication between the inlet and outlet, the arm member is manually returned to its original position to enable the float to descend to its original position after the chamber has been emptied of milk. When the float and disk valve are in their lowermost positions, the communication between the inlet and outlet is closed causing the diaphragm valve to be actuated to provide for the release of the teat cups from the cow's udder.

One disadvantage with this milk flow sensor is that the operator must wait until enough milk has entered the chamber to support the float before the arm member can be returned to its original position. A substantial amount of time can be saved if the arm member is automatically returned to its original position at the appropriate time.

It is the object of the present invention, therefore, to provide an improved milk flow sensor whereby automatic return of the arm member is provided.

SUMMARY OF THE INVENTION

In accordance with the present invention, a milk flow sensor is provided in which the arm member is movable between a first or original position in which it does not affect the movement of the float member and the valve in the chamber and a second position in which it has engaged and elevated the float member to position the valve at a location where communication exists between the inlet and the outlet. An actuating lever is connected to the arm member and is located outside the chamber so that pivotal movement of the actuating lever produces a corresponding pivotal movement of the arm member. The actuating lever and the arm member are oriented relative to each other so that in the elevated position of the arm member the actuating lever will be inclined with respect to vertical toward the first or original position.

Means operatively associated with the actuating lever and the arm member is provided to urge these elements to their original positions. In one form of the invention, a weight is attached to the actuating lever to serve this function. In another form of the invention, a spring arrangement serves to urge the actuating lever and the arm member to their original positions.

The float member and the arm member are provided with a coacting latch means which is operable to maintain the arm member in the elevated position of the float member thereby restraining return movement of the arm member to its original position. When a sufficient amount of milk is contained in the chamber to support the float member and valve in the elevated position to maintain open communication between the inlet and the outlet, the arm member is released to automatically return to its original position. Thus, the arm member does not impede the descent of the float as the milk drains from the chamber when the cow is finished milking.

Accordingly, the operator need not be present to manually return the lever and arm member to their original positions after the chamber has filled with milk. As the milk flow ceases, the chamber is emptied and the float and disk valve descend within the chamber. When the disk valve has descended to a position closing communication between the inlet and outlet, a signal will be developed notifying the milking equipment to release the teat cups from the cow's udders.

Further objects, features and advantages of the present invention will become apparent from a consideration of the following description and the appended claims when taken in connection with the accompanying drawings in which:

FIG. 1 is a front elevational view of the improved milk flow sensor in which communication between the inlet and outlet is interrupted;

FIG. 2 is a side elevational view of the milk flow sensor shown in FIG. 1;

FIG. 3 is an enlarged fragmentary view of the milk flow sensor with portions shown in section;

FIG. 4 is a front elevational view of the milk flow sensor showing the float and disk valve in an elevated position;

FIG. 5 is an enlarged fragmentary view like FIG. 3, but showing the float in its elevated position;

FIG. 6 is a front elevational view of the milk sensor showing the actuating lever in its original position with the float being supported in the chamber by the milk contained therein; and FIG. 7 is an enlarged fragmentary view like FIG. 3, but showing a modified latch construction on the float member.

DETAILED DESCRIPTION OF THE INVENTION

Referring to the drawing, a milk flow sensor, indicated generally at 10 in FIGS. 1 and 2, operates to automatically provide a signal to milking equipment (not shown) indicating that the flow of milk from the cow has ceased. The milk flow sensor 10 includes a chamber 12 having an inlet 14 and an outlet 16 (FIG. 2) positioned below the inlet 14. A generally hollow float member 18 (FIG. 2) having a disk valve 20 mounted thereon is disposed in the chamber 12 for substantially vertical movement between positions in which the disk valve 20 opens and closes communication between the inlet 14 and the outlet 16. In the closed position, the disk valve 20 is seated against a peripheral ridge 22 that is formed on the inside wall of the chamber 12 and is disposed between the inlet 14 and the outlet 16.

The top of the chamber 12 is covered by a valve assembly 24 which includes a movable diaphragm 26 that is connected to a diaphragm valve (not shown) within the assembly 24. A pair of pneumatic lines 27 and 28 are suitably connected to the sensor 10 and to the automatic milking equipment to provide signals for releasing the teat cups from the cow's udders when the milk from the cow has ceased to flow.

The conventional milk flow sensor 10 on which the present invention is based, is provided with an actuating lever and an arm member that is manually moved to elevate the float member 18 and the disk valve 20 to a position in which communication between the inlet 14 and the outlet 16 is established to permit the initial flow of milk into the chamber 12. After a sufficient amount of milk has entered the chamber 12 to support the float member 18 in a position in which the disk valve 20 is maintained above at least a portion of the inlet 14, the actuating lever is then manually returned to its original position. When the level of the milk in the chamber 12 falls below the outlet 16, a small drain port 19 enables further emptying of the chamber 12 in a relatively slow manner so that the descent of the float member 18 and the valve 20 occurs in a controlled manner.

The present invention provides an arm member 30, as viewed in FIGS. 2 and 3, which is connected by a shaft 32 to an externally located actuating lever 34. The arm member 30 and the shaft 32 are pivotally supported by means of a gasket 36 which is disposed in sealing relationship in an opening 37 formed at the bottom portion of the chamber 12.

The actuating lever 34 and the arm member 30 are movable between a first or original position in which the movement of the float 18 and valve 20 in the chamber 12 is unaffected by the arm member 30, and a second position in which the arm member 30 has elevated the float 18 to a position where communication between the inlet 14 and outlet 16 is established. In the first position, as viewed in FIG. 1, the arm member 30 and the actuating lever 34 are in positions in which the arm member 30 is in a relatively downward position in the chamber 12 so that the float member 18 and valve 20 can move within the chamber 12 without engaging the arm member 30. The arm member 30 and the actuating lever 34 are oriented relative to each other so that in the second position the actuating lever 34 is inclined from the vertical toward the first position as viewed in FIG. 4, while the arm member 30 is in an extended upright position in the chamber 12. Suitable means are provided to restrain further movement of the lever 34 counterclockwise from its second position as viewed in FIG. 4.

Biasing means is provided urging the actuating lever 34 and the arm member 30 toward their first positions. In one form of the invention (FIG. 4), the biasing means comprises a weight 38 connected to the lever 34 by an elongated rod 40 having a hook portion 42 that extends through a hole 44 formed in the lever 34. Since the actuating lever 34 is slightly inclined from the vertical in its second position, the weight 38 provides a constant force on the lever 34 urging it to its first position.

In another form of the invention, as illustrated in FIG. 1, the biasing means comprises a tension spring 46 that is connected to a suitable anchor point 48 and to the actuating lever 34 to urge the actuating lever 34 and the arm member 30 to their first positions. It can be appreciated that various methods and apparatus can be provided for biasing the arm member 30 and the actuating lever 34 to their original positions, but applicant has found that use of a simple weight 38 or the spring 46 provides satisfactory results in performing this function.

Coacting latch means on the float member 18 and the arm member 30 is provided for restraining return movement of the arm member 30 to its first position until a sufficient amount of milk has entered the chamber 12 to support the float member 18. In one form of the invention, as illustrated in FIGS. 3 and 5, the latch means comprises a shoulder member 50 that is mounted on the underside of the float member 18. The shoulder member 50 has an inclined surface 52 on which the arm member 30 rides as it is moved to elevate the float member 18. When the arm member 30 is in its second upright position, it engages a generally upright surface 54 positioned on the inside of the shoulder 50 and is restrained from return movement to its first or original position. In this position, as viewed in FIGS. 4 and 5, milk begins to flow into the chamber 12. When a sufficient amount of milk has entered the chamber 12 so as to further elevate the float 18, the shoulder member 50 is elevated and disengaged from the arm member 30 so that the lever 34 and the arm member 30 can automatically return to their original position under the urging of the weight 38 as viewed in FIG. 6.

In a modified form of the invention as viewed in FIG. 7, the latch means comprises a recess 56 that is formed in the underside of the float member 18. The recess 56 is configured having an upright surface 58 that is engaged by the arm member 30 so as to restrain return movement of the arm member 30 to its first position. Again, when a sufficient amount of milk has been supplied to the chamber 12, the float 18 will be elevated disengaging the float member 18 from the arm member 30 so as to enable the return movement of the actuating lever 34 and the arm member 30 to their original positions.

In the operation of the sensor 10, assume that the weight 38 is used to urge the actuating lever 34 to its first position. In FIGS. 1 and 2, the sensor 10 is shown with the valve 20 seated on the ridge 22 thereby closing communication between the inlet and the outlet 16. The arm member 30 and the actuating lever 34 are in their first positions wherein the movement of the float 18 and the valve 20 in the chamber 12 is unaffected by the arm member 30.

To initiate the flow of milk from the cow through the inlet 14 and to the chamber 12, the operator manually pivots the actuating lever 34 counterclockwise until it is in its second position as illustrated in FIG. 4. The movement of the arm member 30 to its second or upright position causes the float member 18 to be elevated to a position in which communication between the inlet 14 and the outlet 16 is established. In the second position, the arm member 30 engages either the surface 54 of the shoulder 50 (FIG. 5) or the surface 58 in the recess 56 (FIG. 7) depending on which type of latch means is implemented. The return movement of the actuating lever 34 and the arm member 30 to their first positions is thereby restrained. When a sufficient amount of milk has been supplied to the chamber 12 to further elevate the float member 18, as shown in FIG. 6, the arm member 30 is disengaged from the latch means and the weight 38 forces the lever 34 to return to its original position wherein the arm member 30 will be in its first position unaffecting the movement of the float member 18 and the valve 20 in the chamber 12. When the cow has finished milking, the flow of milk to the chamber 12 ceases. After the level of the milk falls below the outlet 16, further draining of milk from the chamber 12 is provided through the drain port 19. When the float member 18 and the valve 20 have descended so that the valve 20 is seated on the ridge 22, communication between the inlet 14 and the outlet 16 is terminated. This causes the diaphragm 26 to be moved to a position causing the air lines 27 and 28 to register a signal to provide for the removal of the teat cups from the cow's udders.

As can be seen from the above description, the present invention provides a low cost improvement for the milk flow sensor 10 which enables the automatic return movement of the arm member 50 and the actuating lever 34 to their original positions after the operator has manually operated the lever 34 to elevate the float member 18 in the chamber 12. This invention therefore provides for reduced operator attention.

What is claimed:

1. In a liquid flow sensor comprising a chamber having an inlet and an outlet positioned below said inlet, a float member disposed in said chamber and having valve means mounted thereon, said float member and said valve means being coincidentally movable in said chamber to open and close communication between said inlet and said outlet, and float elevating means engageable with said float member and movable between a first position in which the movement of said float member and said valve means is unaffected by said float elevating means and a second position in which said float member and said valve means are elevated a predetermined distance providing for open communication between said inlet and outlet, the improvement comprising biasing means urging said float elevating means toward said first position, and coacting latch means on said float member and on said float elevating means for maintaining said float elevating means in said second position against the urging of said biasing means, said latch means including a shoulder member mounted on said float member, and said float elevating means including an arm member engageable with said float member for elevating said float member and engageable with said shoulder member in the second position of said float elevating means so as to be restrained from return movement to said first position, said arm member being released from engagement with said shoulder member and said biasing means providing for the movement of said float elevating means to said first position when a predetermined amount of liquid is contained in said chamber to support said float member and said valve means at a position maintaining said open communication between said inlet and outlet.

2. The apparatus defined in claim 1 further including means pivotally connecting said arm member to said chamber, and an elongated actuating lever connected to said arm member and being movable between said first and second positions to provide for the raising of said float member in said chamber.

3. The apparatus defined in claim 2, wherein said actuating lever is inclined with respect to the vertical in said second position, and wherein said biasing means comprises a predetermined amount of weight connected to said actuating lever for urging said actuating lever to said first position.

4. In a liquid flow sensor comprising a chamber having an inlet and an outlet positioned below said inlet, a float member disposed in said chamber and having valve means mounted thereon, said float member and said valve means being coincidentally movable in said chamber to open and close communication between said inlet and said outlet, and float elevating means engageable with said float member and movable between a first position in which the movement of said float member and said valve means is unaffected by said float elevating means and a second position in which said float member and said valve means are elevated a predetermined distance providing for open communication between said inlet and outlet, the improvement comprising biasing means urging said float elevating means toward said first position, and coacting latch means on said float member and on said float elevating means for maintaining said float elevating means in said second position against the urging of said biasing means, said latch means including means forming a recess in said float member, and said float elevating means including an arm member engageable with said float member for elevating said float member and adapted to be positioned in said recess in the second position of said float elevating means so as to be restrained from return movement to said first position, said arm member being released from said recess and said biasing means providing for the movement of said float elevating means to said first position when a predetermined amount of liquid is contained in said chamber to support said float member and said valve means at a position maintaining said open communication between said inlet and outlet.

5. The apparatus defined in claim 4 further including means pivotally connecting said arm member to said chamber, and an elongated actuating lever connected to said arm member and being movable between said first and second positions to provide for the raising of said float member in said chamber.

6. The apparatus defined in claim 4 wherein said actuating lever is inclined with respect to the vertical in said second position, and wherein said biasing means comprises a predetermined amount of weight connected to said actuating lever for urging said actuating lever to said second position.

7. The apparatus defined in claim 4 wherein said biasing means comprises spring means operatively associated with said arm member and said actuating lever and operable to urge said arm member and said actuating lever to said first position.

8. The apparatus defined in claim 2, wherein said biasing means comprises spring means operatively associated with said arm member and said actuating lever and operable to urge said arm member and said actuating lever to said first positions.

* * * * *